United States Patent
Ditto et al.

(10) Patent No.: US 6,490,028 B1
(45) Date of Patent: Dec. 3, 2002

(54) VARIABLE PITCH GRATING FOR DIFFRACTION RANGE FINDING SYSTEM

(76) Inventors: Thomas D. Ditto, P.O. Box 83, Ancramdale, NY (US) 12503; Douglas A. Lyon, 521 Popes Island Rd., Milford, CT (US) 06460

(*) Notice: Subject to any disclaimer, the term of this patent is extended or adjusted under 35 U.S.C. 154(b) by 0 days.

(21) Appl. No.: 09/331,348

(22) PCT Filed: Dec. 29, 1997

(86) PCT No.: PCT/US97/23841
§ 371 (c)(1),
(2), (4) Date: Jun. 17, 1999

(87) PCT Pub. No.: WO99/44013
PCT Pub. Date: Sep. 2, 1999

Related U.S. Application Data

(60) Provisional application No. 60/034,112, filed on Dec. 30, 1996.

(51) Int. Cl.[7] .............................. G01C 3/08; G01B 9/02
(52) U.S. Cl. ........................................ 356/4.09; 499/521
(58) Field of Search ........................ 356/28.5, 499, 356/521, 4.09

(56) References Cited

U.S. PATENT DOCUMENTS 4,678,324 A * 7/1987 De Witt .................. 356/4.09

* cited by examiner

*Primary Examiner*—Frank G. Font
*Assistant Examiner*—Amanda Merlino
(74) *Attorney, Agent, or Firm*—Schmeiser, Olsen & Watts

(57) ABSTRACT

A means for overcoming perspective foreshortening in the receiver of a diffraction range finder by use of chirp diffraction grating 121. In a diffraction range finder, a diffraction grating with variations in pitch such that the displacement of higher-order diffraction images in a receiver are separated from their associated zero-order image by an arbitrary displacement with respect to an arbitrary target distance. A system for ranging a target comprising a variable pitch grating 122 and a receiver 200 of the diffraction images formed by said grating.

14 Claims, 7 Drawing Sheets

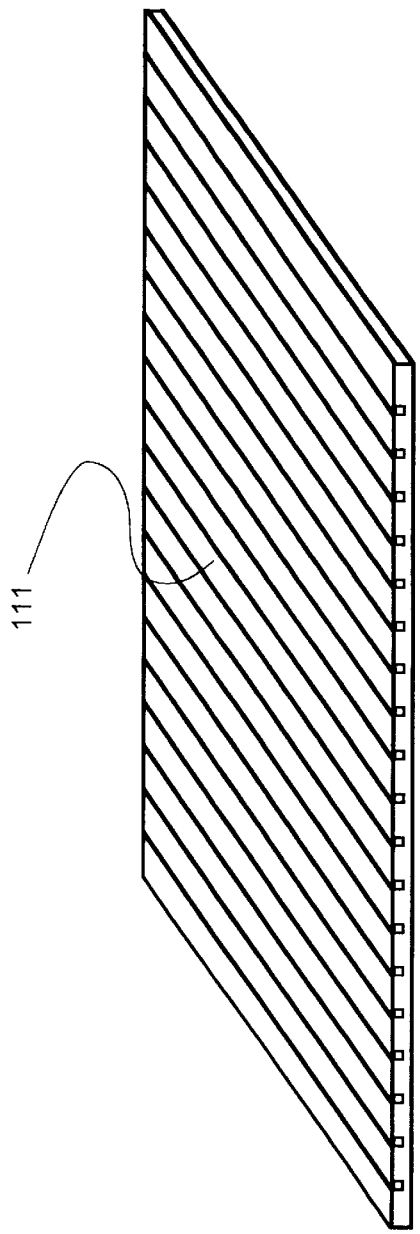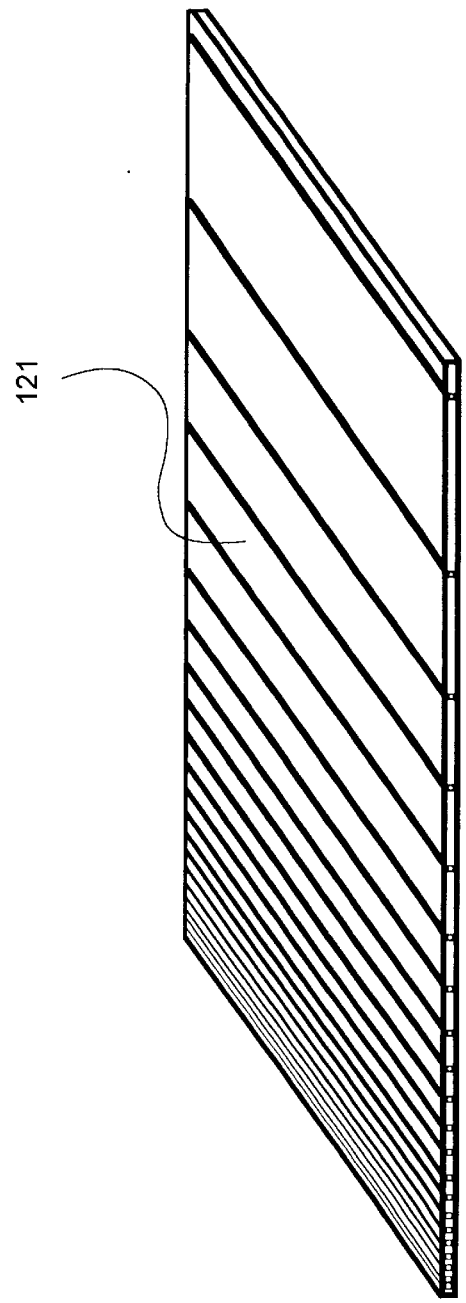
Fig. 3 (a)
Fig. 3 (b)

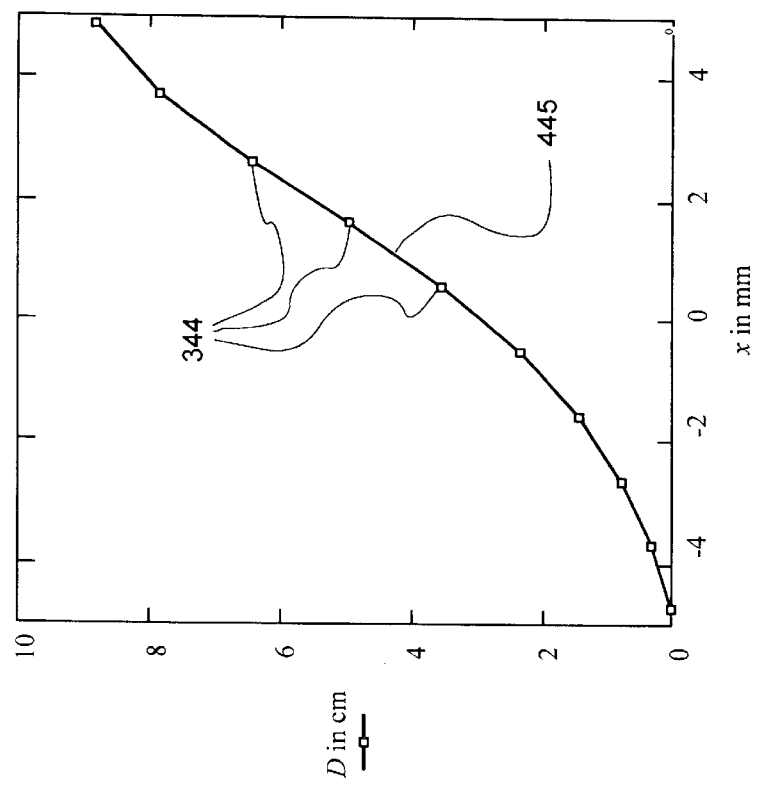
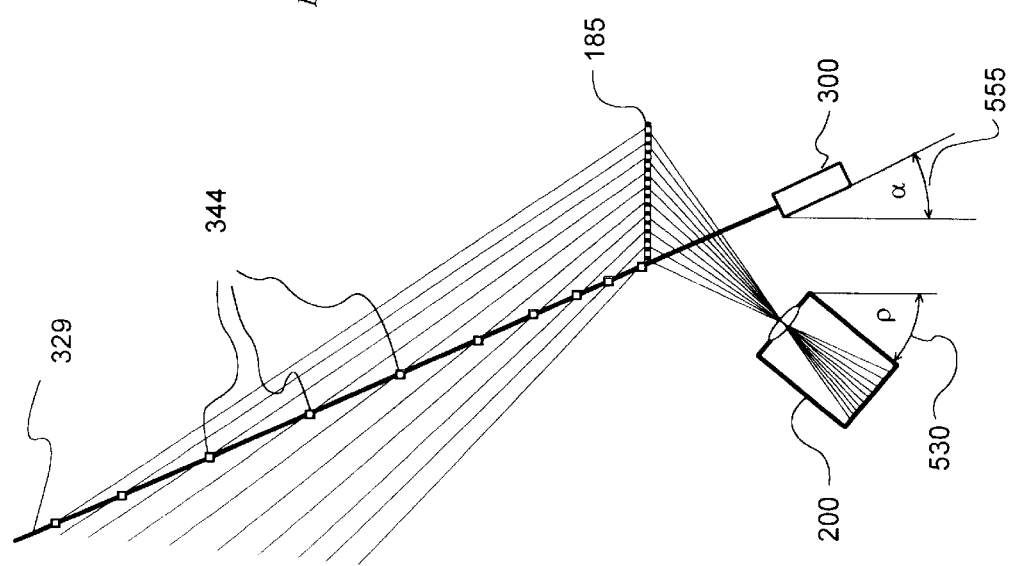
Fig. 8 (b)
Fig. 8 (a)

VARIABLE PITCH GRATING FOR DIFFRACTION RANGE FINDING SYSTEM

RELATED APPLICATION

This invention is based on priority document U.S. Provisional Application titled, "Variable Pitch Grating for a Diffraction Range Finding System and Concomitant Method and Apparatus," No. 60/034,112 filed on Dec. 30, 1996.

STATEMENT OF GOVERNMENT INTEREST

The invention described herein may be manufactured and used by the Government of the United States of America for governmental purposes without payment of any royalties thereon.

TECHNICAL FIELD OF INVENTION

The present invention relates to a species of diffractive optical element called chirp gratings as used in diffraction range finders.

BACKGROUND

Range finding by diffraction is comprised of the methods, devices and systems used to measure distance through exploitation of a phenomenon observed with diffraction gratings wherein the displacement between diffraction images of the various diffraction orders can be correlated to the distance from the grating to an observed source of energy illuminating the grating.

As postulated by Huygens over 3 centuries ago and proven experimentally by Thomas Young in 1801, if energy in the form of a periodic wave strikes an aperture, a new wave front is originated at said aperture. Diffraction gratings are surfaces with many adjacent apertures, typically in the form of ruled straight lines. When a wave front strikes a diffraction grating, new wave fronts originate from all apertures in the grating, and these new wave fronts then interfere with each other both constructively and destructively. Along lines of constructive interference, images can be formed in a receiver which is observing the grating. The images are called the diffraction orders.

The zero-order diffraction image appears along a direct line from the receiver to a source of energy (hereinafter called a "target"). Higher-order diffraction images of a target are reconstructed at the receiver, and they appear displaced to the side of the zero-order. As a target is moved toward or away from a grating surface, the relative displacement of a higher-order image from both the zero-order image and other higher-orders images can be used to measure target range.

The behavior of the higher-order diffraction images as a function of target distance has been previously reported in terms of plane gratings, that is, gratings with a fixed spacing between rules. Diffraction range finders that use plane gratings exhibit a characteristic relationship in the displacement of higher-order diffraction images. There is a maximum asymptotic limit to the displacement of the higher-order images which occurs when a target is at a very great distance from the grating. As a target approaches the grating, the displacement between higher-order images collapses. At point-of-contact with the grating, the higher-order images merge with each other and with the central zero-order image. The displacement of the higher-order images as a function of target distance is a parabolic dependency over the excursion of a target from infinite distance to point-of-contact with the grating. Therefore, the accuracy of a range finder made with plane diffraction gratings varies inversely with the square of the distance.

The behavior of diffraction range finders based on plane gratings is shown by example in the schematic diagram, FIG. 1(a), with correlated graph, FIG. 1(b).

FIG. 1(a) illustrates a diffraction range finder for use in the optical regime of light, that is, visible electromagnetic radiation. The device consists of a plane grating 110, a receiver in the form of a camera 200, and a structured illumination source in the form of a laser 300. The bundle of rays traced from the grating to the camera 150 show instances of the field-of-view of the lens 210 received in the camera. On the other side of the grating, the rays 160 are redirected by the action of the grating. Where these rays cross the line 320 representing the structured illumination, there will be a corresponding ray in the bundle 150. These points of intersection 330, marked with rectangles, are examples of range points that can be acquired by the range finder. They are mapped in the associated graph, FIG. 1(b), generated with equations (3) and (4). The graph trace 410 shows that along focal plane 220 there can be found a point x of the first-order image which correspond to target range D along the line of structured illumination 320. The illustrated case is a diffraction range finder using 635 nm illumination with a 1 micron pitch plane grating of 60 mm length as acquired with a camera with a 50 mm focal length lens.

Hyperbolic and parabolic relationships between target distance and image displacements are characteristic of conventional triangulation range finders as well as diffraction range finders made with plane gratings. The phenomenon is easily observed. For example, the stereo separation of human eyes resolves distance more accurately in the region at arm's length than at distances near the limit of the eyes' ability to perceive two dimensional detail. Similarly, in triangulation range finders which use an active method of illumination such as a laser beam, resolution is inversely proportional to the square of the distance. This is a dependency similar to that found with diffraction range finders made with plane gratings.

An explanation for the inverse square relationship of accuracy to distance to be found in the triangulation and stereopsis range finding methods is that these range finders form the image of a target using a lens, and lenses generate images with perspective foreshortening. The mechanism by which a lens works dictates that as objects recede in distance from a lens, the images of objects of the same size will decrease in size on the focal plane of the lens. This is an observation which has informed perspective rendering since the Renaissance.

Perspective foreshortening can be seen in lenses of any focal length. FIGS. 2(a) & (b) show a schematic representation a camera 200 of focal plane dimension 220 with two lenses. The perspective foreshortening for the shorter focal length 230 shown in FIG. 2(a) is greater than that for the longer focal length 240 shown in FIG. 2(b), but both lenses show appreciable angles-of-view θ, 235 and 245.

FIG. 2(c) shows a characteristic graph trace 420 for the change in 255, view angle θ, as a function of 250, focal length F, in this instance for a 6.5 mm focal plane, typical for a half inch focal plane array. The angle can be known by $$\theta = 2\tan\left(\frac{X}{2F}\right) \quad (1)$$

where X is the length of the camera focal plane

The graph, FIG. 2(c), shows that as the focal length F increases, the angle of the field-of-view θ narrows, but the asymptotically limited angle θ does not reach zero degrees. The far-field accuracy of lens-based range finders can be increased by increasing the focal length of the lens used in the receiver. This will reduce foreshortening but not eliminate it. Moreover, long focal length lenses, such as telescopes, carry a significant weight and cost penalty in design utility. Depth-of-focus is also sacrificed with increased focal length. Additionally, in the case of range finders that use structured illumination such as a stripe or sheet of light for profilometry, the use of a long focal length will diminish the length of the stripe visible at the receiver and hence reduce the acquired profile length.

Diffraction range finders also may incorporate a lens to form an image of the higher-order diffraction images, but perspective effects of the lens are modified by the diffraction grating. Nonetheless, for diffraction range finders with plane gratings of fixed pitch, as have been used in all reported embodiments of diffraction range finders, a perspective-like effect is observed due to the use of a receiver with a lens to form the diffraction image. Again, the accuracy of the range instrument is inversely proportional to the square of the target distance. Indeed, the relationship between higher-order image deflection displacement and target distance follows the same parabolic shape as is characteristic of ranging systems based on the use of lenses such as triangulation and stereoscopy.

Prior Art

A prior art search was conducted. Patents that presage the present invention, wherein a range finder can be made with diffraction gratings are U.S. Pat. No. 4,678,324 awarded to Tom DeWitt (now known as Tom Ditto, the co-inventor of the present invention) on Jul. 7, 1987 for "Range Finding by Diffraction"

U.S. Pat. No. 5,076,698 granted to Smith el al. on Dec. 31, 1991 for "Sensing the Shape of an Object."

The '324 Patent supra defines a gratings as "optical materials with equally spaced lines," [column 2, lines 61–62] and does not attempt to accommodate variable pitch gratings save for the case of compound gratings described therein as "Arrays of gratings . . . " that is, "many pitches of diffraction gratings on a single substrata." [column 4, lines 4–11] The '698 Patent supra, which cites '324 Patent supra, assumes a plane grating and gives an example of a plane grating which is tuned to the argon wavelength.

The concept and fabrication of a variable pitch or chirp grating, upon which the present invention depends, is well known in the art. A common method of fabrication is holography. Holography was used by the present inventors for their realization of a working prototype of the present invention. Illustrative patents include:

U.S. Pat. No. 3,578,845 issued to Brooks el al. on May 18, 1971 for "Holographic Focusing Diffraction Gratings for Spectroscopes and Method of Making Same."

U.S. Pat. No. 4,262,996 bestowed upon Yao on Apr. 21, 1981 for "Chirp-Grating Lens for Guided Wave Optics."

U.S. Pat. No. 5,238,531 earned by Macomber et al. on Aug. 24, 1993 for "Apparatus and Method for Fabricating a Chirped Grating in a Surface Emitting Distributed Feedback Semiconductor Laser Diode Device."

The '845 Patent supra illustrates a holographic process for the fabrication of chirp gratings. In this instance, the resultant chirp grating is intended for spectroscopy. Other patented applications for chirp gratings include light wave guides and internal optics for lasers.

Because of the effects of perspective foreshortening found in triangulation range finders, optical systems have been invented that compensate for this limitation. An example of such systems can be found in U.S. Pat. No. 4,875,777 issued to Harding on Oct. 24, 1989 for "Off-Axis High Accuracy Structured Light Profiler."

The '777 Patent supra is a triangulation range finding system that uses a combination of lenses and mirrors to improve performance, and when practiced by those knowledgeable in the art could overcome perspective foreshortening.

The applicants have found no patent that was issued for an invention that overcomes perspective foreshortening in the receiver of a diffraction range finder by means of a diffraction grating.

Pertinent non-patent publications of prior art written by the inventors are:

1) Thomas D. DeWitt and Douglas A. Lyon, "A Range Finding Method Using Diffraction Gratings," *Applied Optics*, May 10, 1995, Vol. 34 No. 14, pp. 2510–2521

2) Thomas D. DeWitt and Douglas A. Lyon, "Three-dimensional microscope using diffraction gratings," *Three-Dimensional and Unconventional Imaging for Industrial Inspection and Metrology*, SPIE, Vol. 2599, pp. 228–239

These publications, in particular the above referenced Applied Optics paper, are incorporated here by reference as if they were included verbatim and give instruction on diffraction theory as applied to diffraction range finders so as to further acquaint a reader with those facets of theory which are not explicitly detailed in the present text.

Prior art patents and other prior art documents cited above disclose the general concept of a variable pitch or chirp grating. Prior art also discloses methods of range finding by triangulation using lens and mirror systems to compensate for perspective foreshortening. Prior art includes range finding by fixed pitch gratings. The closest and the best prior art is by one of the co-inventors, Thomas Ditto (then named Thomas DeWitt), '324 Patent supra.

Unfortunately none of the prior art devices singly or even in combination meets all of the objectives established by the inventors for a diffraction range finder. The present invention is the first to disclose methods, devices and systems for range finding utilizing variable pitch (or chirped) gratings.

OBJECTIVES

1) The main objective of this invention is to specify a diffraction grating for a diffraction range finder with a pitch geometry such that perspective foreshortening in the receiver can be overcome.

2) It is further an object of this invention to specify a grating for a diffraction range finder that will generate higher-order displacements which are linear with respect to changes in target distance.

3) Still another object of this invention to generate higher-order displacements in a diffraction range finder that vary linearly as function of target distance.

4) An additional objective of this invention is to achieve a weight and size savings over range finding systems of equivalent performance based on mirrors and lenses.

5) Another objective of this invention is that it be robust in operation and require little maintenance or care.

6) A further objective of this invention is that it be extensible in application from a small scale instrument for microscopic range finding to large instruments for longer distances of many meters.

Objects and advantages of the invention have been set forth in part above and will be obvious in part from, or learned by practice with, the invention. The invention consists in the parts, constructions, embodiments and combinations, herein shown and described, or as may be inferred by reading this document.

BRIEF DESCRIPTION OF THE DRAWINGS

The objects, features and advantages of the present invention and its application will be more readily appreciated when read in conjunction with the accompanying drawing, in which:

1) FIG. 1(a) pictorially shows a prior art diffraction range finder with plane or fixed pitch grating complete with a laser as a structured light source, and a receiver.

Figure 1:
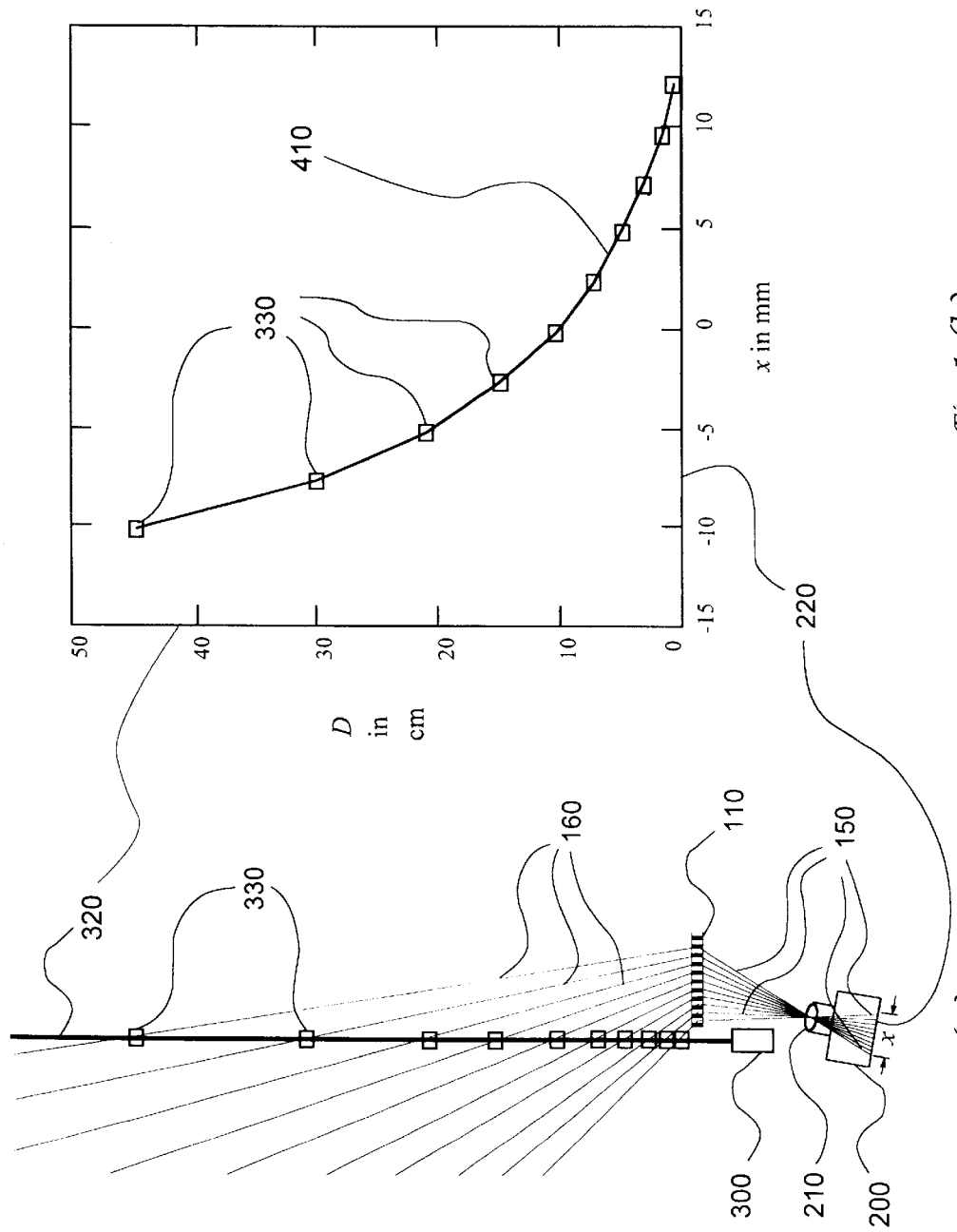

2) FIG. 1(b) graphically shows parabolic shaped relationship between range D of a target and the displacement x along the focal plane at the receiver.

Figure 2:
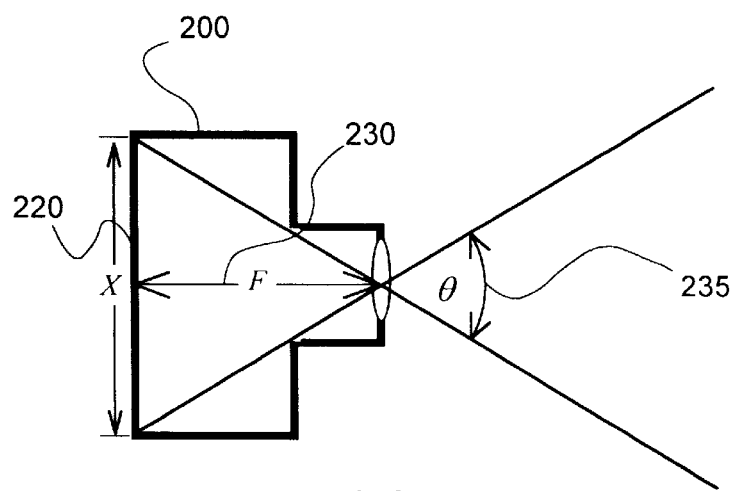
Figure 2:
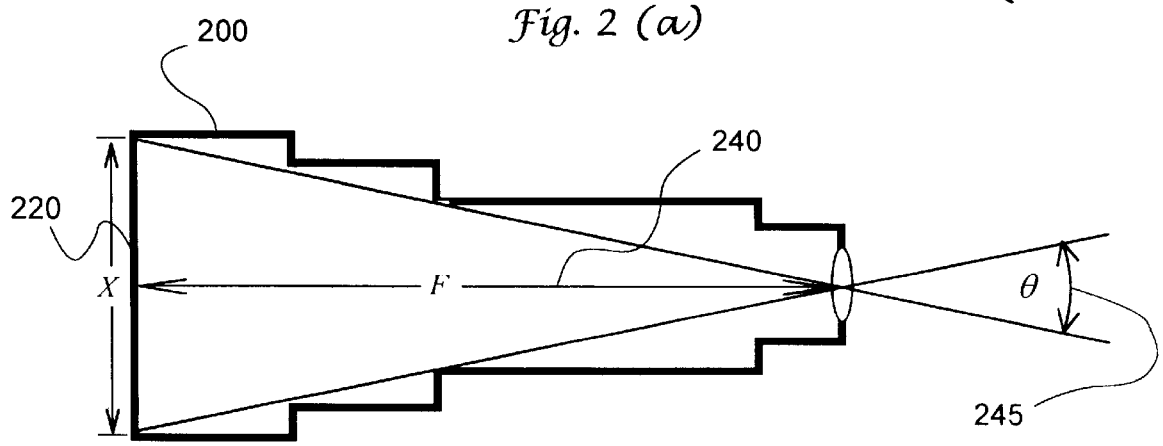
Figure 2:
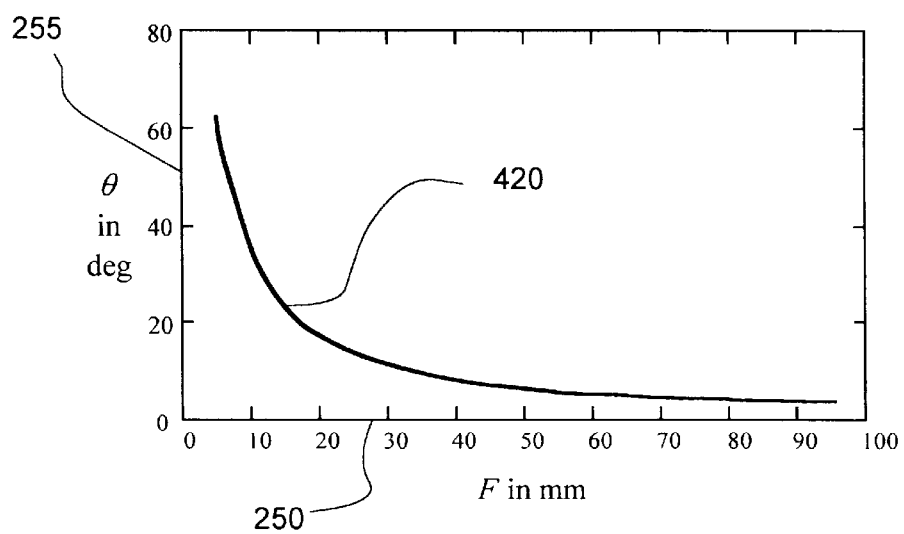

3) FIG. 2(a) pictorially shows wide field of view with a short focal length lens.

4) FIG. 2(b) shows a narrow field of view with a long focal length lens.

5) FIG. 2(c) graphically shows relationship between focal length F (along y axis of the graph) and field-of-view θ in degrees for a 6.5 mm focal plane.

6) FIG. 3(a) shows a plane or fixed pitch grating highly magnified.

7) FIG. 3(b) shows a chirped or variable pitch grating also highly magnified.

Figure 4:
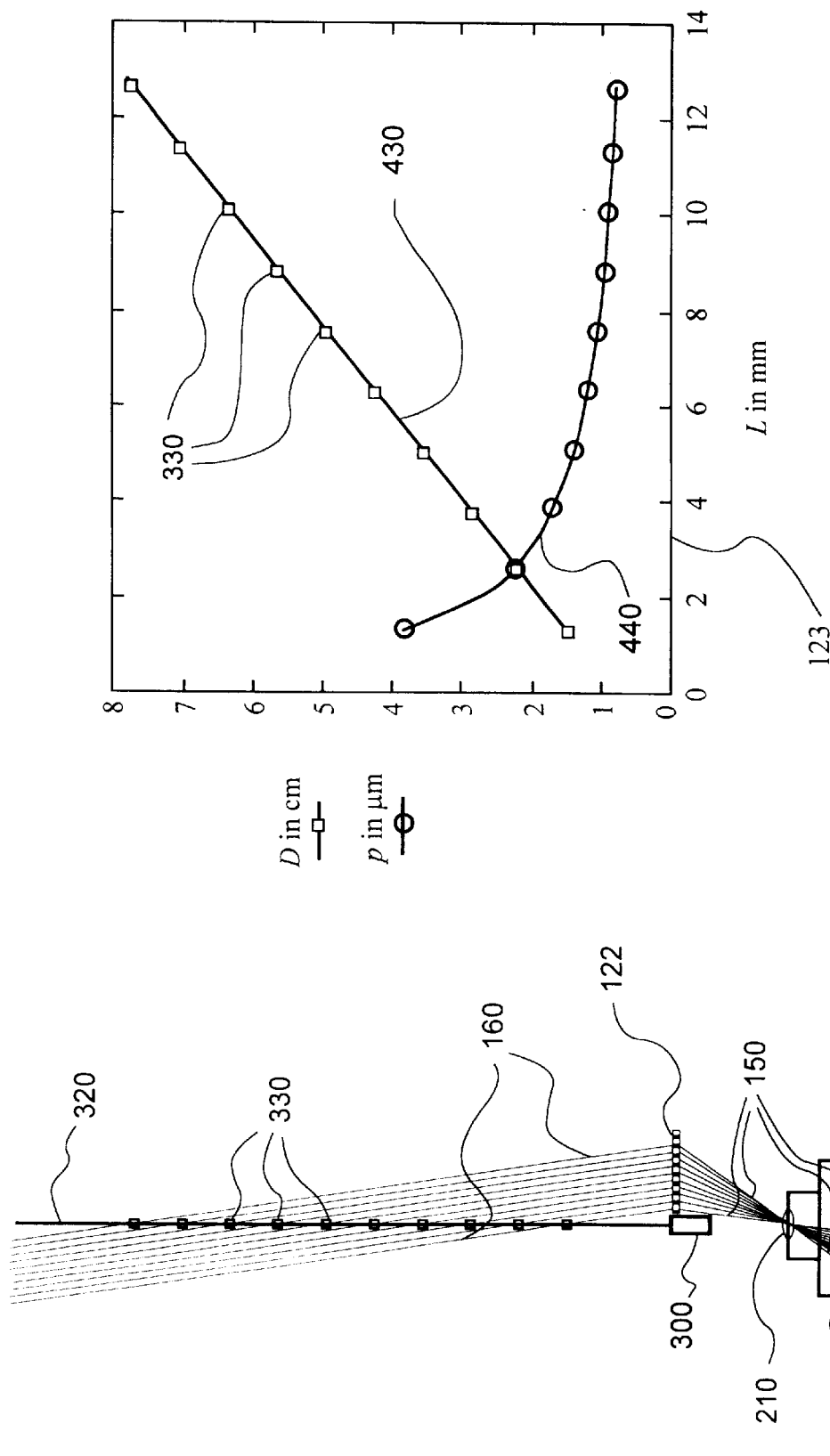

8) FIG. 4(a) pictorially shows a diffraction range finder with a chirped or variable pitch grating complete with a laser as a structured light source, and a receiver.

9) FIG. 4(b) compares the change in pitch p of a grating across the length of its face L with the correlated linearization of the displacement x of the diffraction image with the corresponding range D.

Figure 5:
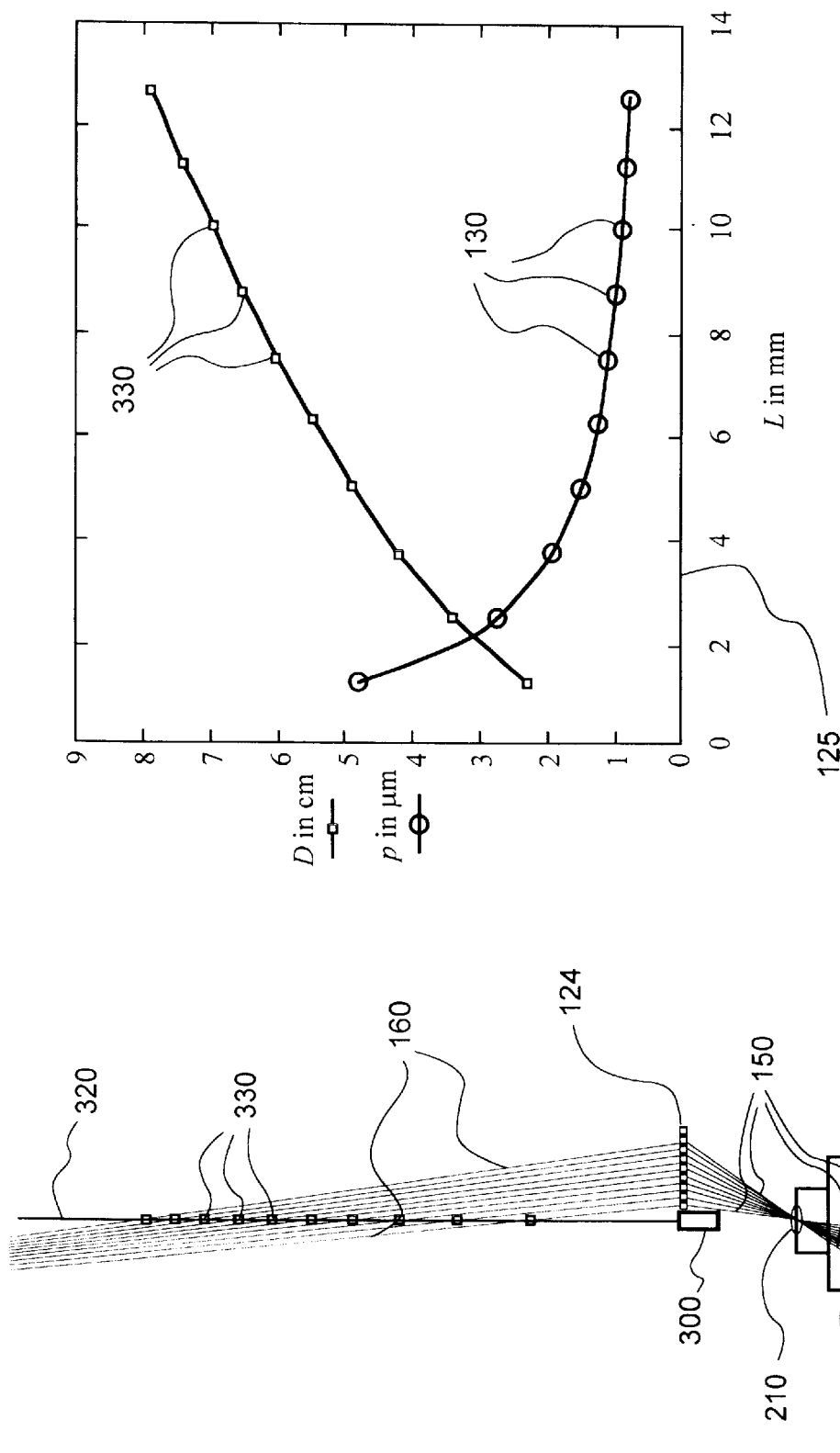

10) FIG. 5(a) pictorially shows a diffraction range finder with a chirped grating wherein rays traced from the grating surface converge with increased range.

11) FIG. 5(b) graphically compares instances of range points with grating pitch for the diffraction range finder illustrated in FIG. 5(a).

Figure 6:
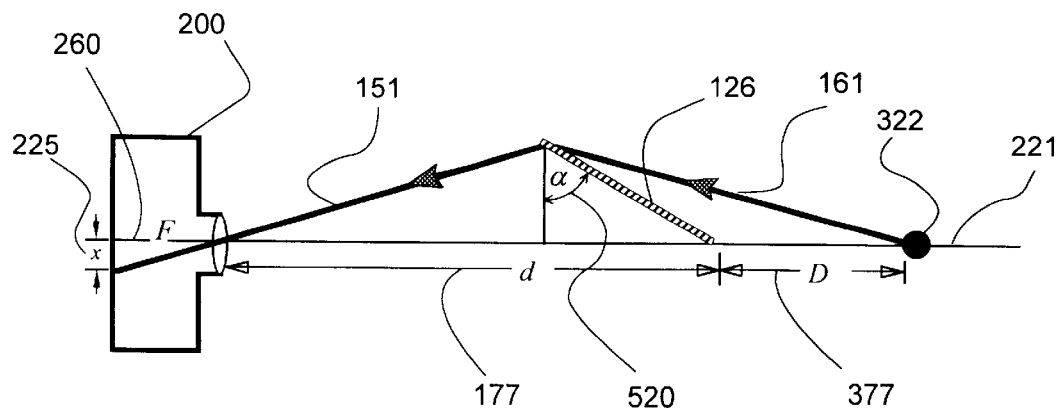

12) FIG. 6 shows an embodiment of the present invention with the grating rotated by an angle α relative to the axis of structured illumination and a co-axial receiver such as a camera.

Figure 7:
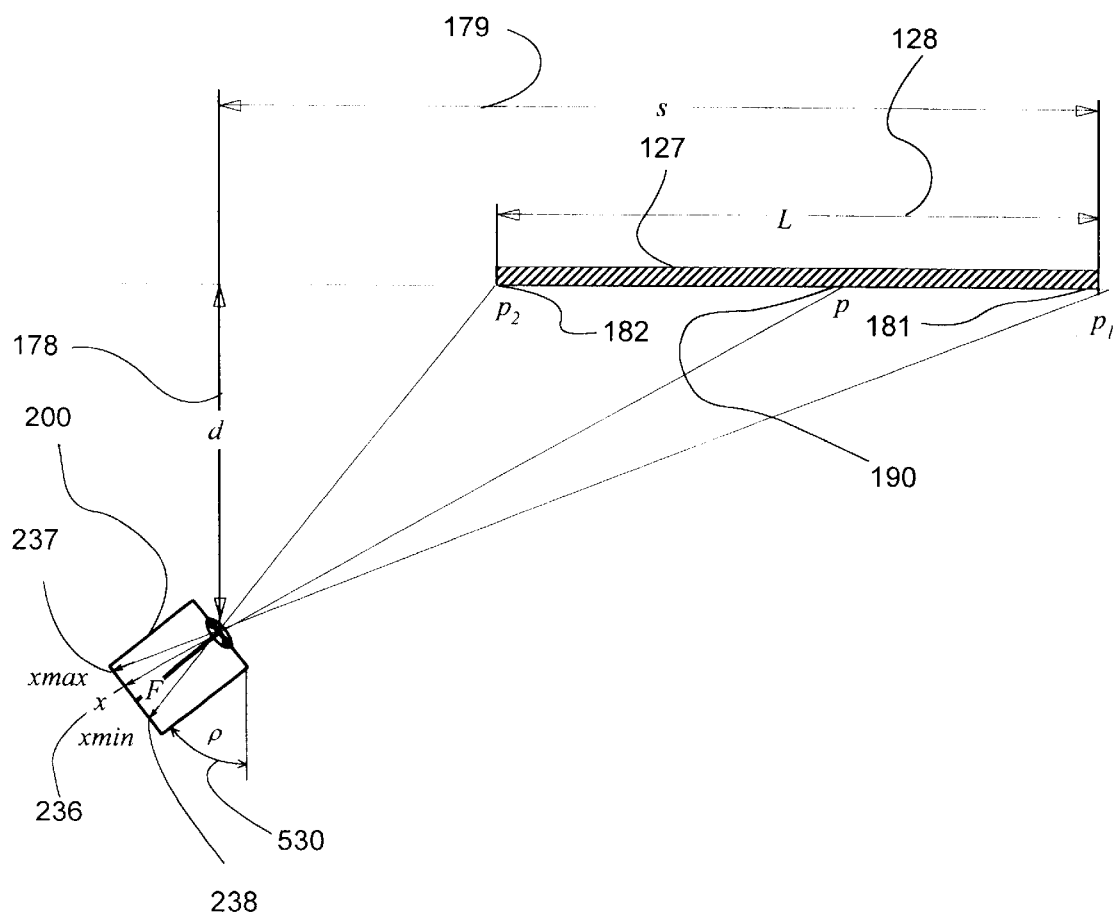

13) FIG. 7 shows how a pitch p that corresponds to a focal plane position x can be determined from the pitches of the grating extrema and the position of a camera.

14) FIG. 8(a) shows a linear chirp grating in a diffraction range finder

15) FIG. 8(b) graphically shows target range D as a function of displacement x along a camera focal plane for the linear chirp grating illustrated in FIG. 8(a).

SUMMARY OF INVENTION

It has been found that the objects of this invention may be realized by varying the pitch of a diffraction grating across its length. Unlike the regular rulings of a plane grating 111 as illustrated in FIG. 3(a), the distribution of rulings in a chirped grating 121 changes in pitch across the grating length as illustrated in FIG. 3(b).

As employed in a diffraction range finder, a chirped grating must have pitch specifications that are determined by the distance to be ranged and the desired angle of view at the receiver. It then follows that for any given range distance, a pitch can be specified that will produce a desired higher-order image displacement in the receiver.

Specification of a grating that will produce a desired higher-order image displacement for a given target distance can be made using equations that are derived from the well-known Grating Equation $$\sin(r) + \sin(i) = n\frac{\lambda}{p} \quad (2)$$

where
  r is the angle at which diffraction images are reconstructed
  i is the angle of incidence of a wave front
  n is the diffraction order, an integer
  λ is the wavelength of incident energy
  p is the pitch of the grating In the near-field where the wave front striking the grating is appreciably spherical, angles i and r vary as a function of the range of the source. This is the basis of range finding by diffraction. A measurement of the angle r at a receiver at distance d from the grating will yield the range D of a target according to the relationship:

$$D = d\tan(r)\frac{\sqrt{1 - \left(n\frac{\lambda}{p} - \sin(r)\right)^2}}{n\frac{\lambda}{p} - \sin(r)} \quad (3)$$

In the regime of visible radiation, the receiving angle r is acquired using a camera with a lens of focal length F along a focal plane where a displacement x along one axis can be measured. In this setting it can be said:

$$r = \arctan\left(\frac{x}{F}\right) \quad (4)$$

$$i = \arctan\left(\frac{xd}{FD}\right) \quad (5)$$

It is possible to alter the characteristic parabolic shaped dependency of displacement of higher-order diffraction images as a function of target range by changing the pitch of the grating along its length. The new relationship by substituting equations (3) and (4) into equation (2) and then solving for p.

$$p = \frac{n\lambda}{\sin\left(\arctan\left(\frac{x}{F}\right)\right) + \sin\left(\arctan\left(\frac{xd}{FD}\right)\right)} \quad (6)$$

Using this equation, an arbitrary displacement x on the focal plane of a camera and an arbitrary distance D of a target a grating pitch will determine an appropriate grating pitch, p.

Preferred Embodiment

The parabolic shaped dependency between range and higher-order image displacement characteristic of the use of plane gratings in diffraction range finders can be overcome by specification of a chirped grating. One desirable relationship is to create a linear dependency between change in target range and displacement of the higher-order diffraction image across the focal plane of a receiver.

FIG. 4(a) illustrates a diffraction range finder which will produce the desired linearity. The rays 150 traced from the camera 200 to the chirp grating 122 show the camera field-of-view. The rays 160 from the grating outward toward the line of illumination, show the lines of sight that can be imaged by the camera. These rays from the grating are parallel, and the intersections with the laser 300 line of illumination 320 occur at evenly spaced intervals 330.

The specification can be graphed as the change in pitch over the length of the grating. The grating length L can be known by position of focal plane x multiplied by distance from lens to grating d as divided by the lens focal length F. That is, $$L = \frac{xd}{F} \qquad (7)$$

FIG. 4(b) presents a graph trace 440 to show how the grating 122 with a variable pitch p along its length L can be specified which will produce a linear displacement which is proportional to a change in target range D. The graph trace 430 compares the change in the distances being ranged with the pitch of the grating in the correlated trace 440. Both of the variables, p and D are mapped against the grating length L 123. In the superimposed graphs, the grating pitch is seen to change in a non-linear fashion while the ratio of distance to grating length is invariant. This ratio corresponds to the desired linear steps of higher-order image displacement relative to range.

First Alternative Embodiment

A chirped diffraction grating can be specified to produce an increasing displacement of the higher-order images relative to target range as range increases. Such a grating can be specified by means of the same equations as were used to model the chirped grating that linearizes the range to higher-order image displacement. However, in this embodiment a non-linear function for D is specified. For example, a function can be posited where D increases by its square root relative to higher-order image displacements.

As illustrated in FIG. 5(a), the ray bundle 160 converges as distance from the grating 124 increases so that the instances of the intersection of the illumination beam 320 originating at laser 300 are seen to come closer together as the distance increases from the grating increases. The change in pitch of across the considerable length L of grating 125 is graphed in FIG. 5(b) where instances the pitch 130 are correlated with their corresponding range points 330.

Second Alternative Embodiment

The above Embodiments conform to the component configuration found in the Preferred Embodiment of the basic method of Range Finding by Diffraction (U.S. Patent '324 supra) in so far as that the camera and grating are in a parallel orientation relative to one another.

A more generalized configuration of the components in a diffraction range finder should allow unrestricted placement of the camera and laser relative to the grating. Benefits to be derived from such design choices could include a more compact instrument package, improved range sensitivity, and greater flexibility over variety of range limits.

FIG. 6 illustrates an embodiment in which grating is rotated by an angle α relative to a normal to the central ray 221 of the lens of camera 200. Target 322 generates ray 161 which becomes ray 151 by action of the grating. For a lens of focal length F 260, the dependency of the grating pitch p upon the target distance D 377 as well as the corresponding displacement along the focal plane x 225, can be expressed as:

$$p = \frac{n\lambda}{\sin\left(\arctan\left(\frac{x}{F}\right) - \alpha\right) + \sin\left(\arctan\left(x\frac{d}{D\tan(\alpha)x + DF + d_1\tan(\alpha)x}\right) + \alpha\right)} \qquad (8)$$

where
- α 520 is the angle of rotation of the grating relative to the axis of the receiver and source of illumination
- d 177 is the distance from the receiver to an intersection with the grating along the axis of illumination The pitch specification generated by equation (8) could be graphed against the length of the grating L using the simultaneous equation:

$$L = d\frac{x}{F\cos(\alpha) + x\sin(\alpha)} \qquad (9)$$

Third Alternative Embodiment

In most cases, the gratings specified above have changes in pitch which are not linear, but some chirped gratings have a linear change in pitch across the grating width. FIG. 7 characterizes such a grating 127 by specifying L, the length 128, and the pitches $p_1$ 181 and $p_2$ 182 at the grating length extrema. For a chirped grating which has a continuous linear variation in pitch p across its length the pitch 190 imaged at the focal plane of a camera 200 at position 236 can be determined for any position x on the focal plane by the equation:

$$p = p_1 - \left(\frac{p_1 - p_2}{L}\right)\left(s - d\tan\left(\rho + \arctan\left(\frac{x}{F}\right)\right)\right) \qquad (10)$$

where
- ρ (rho) 530 is the angle of rotation of the camera relative to the normal to the grating plane
- d 178 is the distance from the lens to the grating along the normal to the grating
- s 179 is the distance from the lens to the normal extended from the grating where the pitch is $p_1$
- and where the upper bound 237 and the lower bound 238 of points along the focal plane such that the grating can be within the field of view of the camera are known by:

$$x_{max} = F\tan\left(\arctan\left(\frac{s}{d}\right) - \rho\right) \qquad (11\ a)$$

$$x_{min} = F\tan\left(\arctan\left(\frac{s-L}{d}\right) - \rho\right) \qquad (11\ b)$$

A diffraction range finder that utilizes a linear chirp grating characterized in FIG. 7 is illustrated in FIG. 8(a). Equations (11 a) and (11 b) establish extrema for the linear chirp in grating 185. By using the values for p that correspond to particular values of x acquired at focal plane of camera 200, range D along a designating line of illumination 329 originating with laser 300 can be calculated by:

$$D = \frac{\left(\frac{\sqrt{\left(1-n\frac{\lambda}{p}-\sin\left(\rho+\arctan\left(\frac{x}{F}\right)\right)\right)^2}}{n\frac{\lambda}{p}-\sin\left(\rho+\arctan\left(\frac{x}{F}\right)\right)}\right)\left(d\tan\left(\rho+\arctan\left(\frac{x}{F}\right)\right)\right)-s)}{\cos(\alpha)-\left(\frac{\sqrt{1-\left(n\frac{\lambda}{p}-\sin\left(\rho+\arctan\left(\frac{x}{F}\right)\right)\right)^2}}{n\frac{\lambda}{p}-\sin\left(\rho+\arctan\left(\frac{x}{F}\right)\right)}\right)-\sin(\alpha)} \quad (12)$$

where

α 555 is the angle of the laser relative to a normal from the grating

ρ 556 is the angle of the camera relative to a normal from the grating

The relationship between target range and image displacement x appears in the graph in FIG. 8(*b*). Correlated instances of range along the line of illumination are indicated by markers 344 on the trace 445 and the line of illumination 329.

Linear chirp gratings in a diffraction range finder can be modeled using a computer program written by one of the present inventors and published in November 1997 after submission of U.S. Provisional Application titled, "Variable Pitch Grating for a Diffraction Range Finding System and Concomitant Method and Apparatus," No. 60/034,112 filed on Dec. 30, 1996. The computer program, called DiffCAD, appears on an attached CD-ROM and within the textbook by Douglas A. Lyon and Hayagriva V. Rao, Java Digital Signal Processing, MIS-Press Press, New York, N.Y.

RAMIFICATIONS OF THE INVENTION

The present invention of a chirped grating for a diffraction range finder gives diffraction range finders significant advantages over both triangulation range finders and the previously disclosed diffraction range finder based on plane gratings. Following the teaching given herein, specification of a relationship between image displacement in the receiver and target distance will allow those persons practiced in the art to tailor diffraction gratings for range finders to the explicit demands of their usage. Improvements in performance will be found in a variety of parameters including but not limited to the accuracy and resolution of the range finder, the stand-off of the range finder to the target, the overall target range, the visibility of the target and the allowable shape of the range finding instrument. Moreover, the present invention can readily be adapted by those practiced in the art of range finder design to improve the performance of extant triangulation range finders, these being the most commonly employed devices for near field ranging and 3-D surface acquisition.

REFERENCE NUMERALS

Here follows a listing of the components, elements and graphical elements used in this document in ascending order of their reference number with associated Figures and brief descriptions.

| No. | FIG. | Description |
|---|---|---|
| 110 | 1 (a) | plane diffraction grating |
| 111 | 3 (a) | plane grating |
| 121 | 3 (b) | chirp grating |
| 122 | 4 (a) | chirp grating which linearizes higher-order deflection |
| 123 | 4 (b) | Grating length axis |
| 124 | 5 (a) | chirp grating which reverses perspective foreshortening at the receiver |
| 125 | 5 (b) | Grating length axis |
| 126 | 6 | chirp grating |
| 127 | 7 | linear chirp grating |
| 128 | 7 | length of grating |
| 130 | 5 (b) | instances of grating pitch correlated to grating length |
| 150 | 1 (a) | rays from grating to camera focal plane |
| 150 | 4 (a) | rays from grating to camera focal plane |
| 150 | 5 (a) | rays from grating to camera focal plane |
| 151 | 6 | ray from grating to focal plane |
| 160 | 1 (a) | rays from target to diffraction grating |
| 160 | 4 (a) | rays from target to diffraction grating |
| 160 | 5 (a) | rays from target to diffraction grating |
| 161 | 6 | ray from target to diffraction grating |
| 177 | 6 | distance from lens to grating along camera central ray |
| 178 | 7 | distance of lens to grating d |
| 179 | 7 | spacing s of camera to end of grating |
| 181 | 7 | pitch $p_1$ at a grating edge |
| 182 | 7 | pitch $p_2$ at opposing grating edge |
| 185 | 8 (a) | linear chirp grating |
| 190 | 7 | grating pitch p along grating length |
| 200 | 6 | camera |
| 200 | 7 | camera |
| 200 | 2 (a) & (b) | camera |
| 200 | 4 (a) | camera |
| 200 | 5 (a) | camera |
| 200 | 8 (a) | camera |
| 210 | 1 (a) | lens |
| 210 | 4 (a) | lens |
| 210 | 5 (a) | lens |
| 220 | 1 (a) & (b) | position x along camera focal plane |
| 220 | 2 (a) & (b) | camera focal plane |
| 221 | 6 | camera lens central ray |
| 225 | 6 | position x along camera focal plane |
| 230 | 2 (a) | wide angle camera focal length |
| 235 | 2 (a) | wide angle camera field-of-view |
| 236 | 7 | position x along camera focal plane |
| 237 | 7 | upper bound of grating image on focal plane |
| 238 | 7 | lower bound of grating image on focal plane |
| 240 | 2 (b) | narrow angle camera focal length |
| 245 | 2 (b) | narrow angle camera field-of-view |
| 250 | 2 (c) | focal length axis |
| 255 | 2 (c) | angle of view axis |
| 260 | 6 | camera focal length |
| 300 | 1 (a) | laser |
| 300 | 4 (a) | laser |
| 300 | 5 (a) | laser |
| 300 | 8 (a) | laser |
| 320 | 1 (a) | range distance /) along a line of interrogating illumination |
| 320 | 4 (a) | range distance /) along a line of interrogating illumination |
| 320 | 5 (a) | range distance /) along a line of interrogating illumination |
| 322 | 6 | target |
| 329 | 8 (a) | range distance /) along a line of interrogating illumination |
| 330 | 1 (a) & (b) | instances of range along rays correlated with positions on a focal plane |
| 330 | 4 (a) & (b) | instances of range along rays correlated with positions on a focal plane |
| 330 | 5 (a) & (b) | instances of range along rays correlated with positions on a focal plane |
| 344 | 8 (a) & (b) | instances of range along rays correlated with positions on a focal plane |
| 377 | 6 | target range /) |
| 410 | 1 (b) | graph trace of range /) vs focal plane position |
| 420 | 2 (c) | graph trace relating focal length to field-of view |
| 430 | 4 (b) | graph trace relating range to position along grating length |

-continued

| No. | FIG. | Description |
|-----|------|-------------|
| 440 | 4 (b) | graph trace relating grating pitch to position along grating length |
| 445 | 8 (a) | graph trace of range /) vs focal plane position |
| 520 | 6 | angle of grating rotation |
| 530 | 7 | angle of camera rotation |
| 555 | 8 (a) | angle of laser rotation |
| 530 | 8 (a) | angle of camera rotation |

DEFINITIONS

Chirp (or Chirped) Grating—A diffraction grating with a variable pitch spacing between rulings over the length of the grating N.B. The term "chirp" was introduced into the lexicon of diffraction gratings with the invention of gratings that are temporally varied in pitch by means of acoustical optics. Prior to this usage, the term chirp had been applied to frequency-modulated radar.

Compound Grating—a diffraction grating consisting of an assembly of plane diffraction gratings Diffraction gratings—Structures with many adjacent rules at a proximate spacing so as to cause observable constructive interference in periodic wave fronts incident upon said structure Diffraction higher-orders—Images formed in a receiver along lines of constructive interference formed by a grating Focal length—The distance from a lens to a focal plane for a lens focused at infinity Foreshortening—A division that scales points toward the center of a perspective projection Perspective—A 3-D space projection into 2-D which is a function of a view volume and that preserves relative depth Plane grating—A diffraction grating with a fixed pitch spacing between rulings over the length of the grating Pitch—The reciprocal of wave length Receiver—A transducer that converts the energy of the diffraction image into a measurement of relative displacement.

Stereopsis—A method of determining range by measurement of the relative offsets between two images formed at two receivers separated by a considerable length baseline Target—the source of energy illuminating the grating in a diffraction range finder Triangulation range finder—A device that determines distance by measurement of the relative offsets between images formed at a receiver from targets illuminated by a designating source of illumination While this invention has been described with reference to illustrative embodiments, this description is not intended to be construed in a limiting sense. Various modifications and combinations of the illustrative embodiments as well as other embodiments of the invention will be apparent to persons skilled in the art upon reference to this description. Diffraction occurs in all regimes where energy is propagated by periodic waves, and the present invention is not restricted to light or electromagnetic radiation but may include energy transmission in any compliant medium. Chirp diffraction gratings with frequency variations following sinusoidal, parabolic, Gaussian or other mathematical functions may be used to achieve desirable results. Compound gratings with any one of a countless variety of configurations of discrete plane gratings may be specified. Embodiments may take on many specific forms for rotation of the receiver, a grating or a designating source of illumination. It is therefore, contemplated that the appended Claims will cover any such modifications or embodiments as fall within the true scope of the invention.

We claim:

1. A system for determining a range from a target to a diffraction grating, said system comprising:
   the diffraction grating having a variable pitch, wherein the diffraction grating is adapted to diffract energy received from the target, said energy being propagated in wave fronts by periodic waves; and
   a receiver adapted to receive the energy diffracted by the grating and to form an associated diffraction image that includes high-order diffraction, wherein the range is determined from said diffraction image.

2. The system of claim 1, wherein the variable pitch is a continuously variable pitch.

3. The system of claim 2, wherein the continuously variable pitch has a linear variation.

4. The system of claim 1, wherein the diffraction grating is a compound grating, and wherein the variable pitch comprises discrete steps.

5. The system of claim 1, further comprising means for overcoming perspective foreshortening in the receiver by use of the diffraction grating.

6. A diffraction range finder, comprising a diffraction grating:
   wherein the grating has a variable pitch;
   wherein the grating is adapted to diffract energy received from a target such that a high-order diffraction image is formed in a receiver from said energy diffracted by the grating, said energy being propagated in wave fronts by periodic waves; and
   wherein the high-order diffraction image and the associated zero-order image are separated by a displacement that is a function of a target distance between the target and the grating.

7. The diffraction range finder of claim 6, wherein the variable pitch is a continuously variable pitch.

8. The diffraction range finder of claim 7, wherein the continuously variable pitch has a linear variation.

9. The diffraction range finder of claim 6, wherein the diffraction grating is a compound grating, and wherein the variable pitch comprises discrete steps.

10. A method for determining a range from a target to a diffraction grating, said method comprising:
    providing the diffraction grating and a receiver, wherein the diffraction grating has a variable pitch;
    diffracting, by the diffraction grating, energy received by the diffraction grating from the target, said energy being propagated in wave fronts by periodic waves; and
    receiving, by the receiver, the energy diffracted by the grating; and
    forming a diffraction image, by the receiver, from the energy received by the receiver.

11. The method of claim 10, wherein the variable pitch is a continuously variable pitch.

12. The method of claim 11, wherein the continuously variable pitch has a linear variation.

13. The method of claim 10, wherein the diffraction grating is a compound grating, and wherein the variable pitch comprises discrete steps.

14. The method of claim 10, further comprising overcoming perspective foreshortening in the receiver by use of the diffraction grating.

\* \* \* \* \*